United States Patent Office 3,254,936
Patented June 7, 1966

3,254,936
DYEING HYDROPHOBIC TEXTILES WITH AN AZOMETHINE OF AN AROMATIC AMINE AND A QUINONE, N-HALOQUINONEIMINE OR A CYCLOHEXENEONE
Max Schwarz and Winfried Kruckenberg, Leverkusen, Erich Lehmann, Burscheid, Felix Gund, Leverkusen, and Walter Hees, Cologne-Hohenberg, Germany, assignors to Farbenfabriken Bayer Aktiengesellschaft, Leverkusen, Germany, a corporation of Germany
No Drawing. Filed Mar. 5, 1962, Ser. No. 177,156
Claims priority, application Germany, Mar. 8, 1961, F 33,372; Aug. 19, 1961, F 34,739
27 Claims. (Cl. 8—55)

The invention is concerned with a process for the dyeing or padding of hydrophobic materials.

In copending application Serial No. 117,271, filed June 15, 1961, and now abandoned, we have disclosed that on structures such as filaments, fibres, foils, ribbons and the like made from hydrophobic materials, such as aromatic polyesters, for example polyethylene terephthalates or polyesters of terephthalic acid and 1,4-bis-hydroxymethyl cyclohexane, synthetic polyamides and polyurethanes, polyvinyl chlorides, polyacrylonitrile and its mixed polymerisates, cellulose esters and polyolefines, such as polyethylenes and polypropylenes, valuable dyeings can be produced if the dyeing material is treated in any desired order consecutively with either (1) an aromatic compound containing a primary and/or secondary amino group, or (2) the salts of said aromatic compounds; and then with (a) a quinone or (b) an N-haloquinoneimine or an N,N'-dihaloquinone-diimine or (c) with a compound which contains the grouping

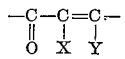

in a carbocyclic ring, wherein X and Y means a carbon-carbon bond, hydrogen or halogen.

Instead of using a quinoid compound itself, the process can be modified in such a way that the dyeing material is treated with an aromatic compound of groups (1) or (2) above and (e) a compound which is transformed into a quinoid compound by the action of an oxidizing agent, and (f) with an organic or inorganic oxidizing agent, if desired, with the addition of an acid.

We have now discovered that the above process may be effectively carried out by substituting for the aromatic compound of groups (1) or (2) above an azomethine of an aromatic amine, especially one which contains a solubilizing group in the radical of the aldehyde component. Additionally, we have discovered that instead of the components (a), (b) or (c) a quinone-anil-N-halo-imide (d) can also be used, if desired in admixture with (a) and/or (b).

According to all the above mentioned new processes mostly dark colored, especially black dyeings are obtained which are distinguished by good general fastness properties, particularly very good fastness to sublimation and light. Of special interest are the process for dyeing aromatic polyesters (polyethylene terephthalate).

The azomethines to be used according to the process can be obtained, for example, by condensation of the amines described below with the aldehydes mentioned below; aromatic aldehydes are preferably used as aldehyde components.

Amines: 4-amino-diphenylamine, 4-amino-4'-methoxy- or -2'-methoxy-diphenylamine, 1,8-diaminonaphthalene, 1-amino-4-phenylaminonaphthalene, benzidine, 4-amino-naphthalene-1,1'-azo-4'-aminobenzene, 4,4'-diamino-azobenzene, 3-methoxy-4-aminodiphenylamine, 4-amino-4'-naphthyl-diphenylamine, 4-amino-4'-cyclohexyl-diphenylamine, 4-amino-4'-methyl-diphenylamine, 2,4-diamino-diphenylamine, dianisidine, p-aminophenyl-aminodiphenyl amine, p-aminophenylamino-diphenyl oxide, m-phenylene diamine, 4-amino-2-chloro-4'-(N-dihydroxyethyl)-amino-1,1'-azobenzene, 4-benzoylamido-2,5-dimethoxy-1-amino-benzene, furthermore 4,4'-diaminostilbene, bis-(p-aminophenyl)-4,4'-diamino-diphenylamine, bis-(p-aminophenyl)-4,4'-diaminodiphenyl oxide, bis-(p-aminophenyl)-4,4'-diamino-diphenylmethane, bis-(p-aminophenyl)-4,4'-diaminostilbene, bis-(p-aminophenyl)-4,4'-diamino-3,3'-dimethoxy diphenyl. If di- or polyamino compounds are used for the preparation of the corresponding azomethines all amino groups have to be transformed into azomethine groupings so that the azomethine compound contains no free primary amino group.

As aldehydes there may be considered: o-benzaldehyde-sulfonic acid, p-benzaldehyde sulfonic acid, m-benzaldehyde sulfonic acid, o,p-benzaldehyde disulfonic acid or the corresponding carboxylic acid derivatives, benzaldehyde-disulfimide and naphthaldehyde-sulfonic acids, furthermore aldehydes without solubilizing groups, such as benzaldehyde, 4-nitrobenzaldehyde, 4-methoxybenzaldehyde, 4-dimethylamino benzaldehyde, 1-naphthaldehyde, 2-naphthaldehyde, terephthalic dialdehyde, p-chloro-benz-aldehyde, salicylic aldehyde and tolylaldehyde.

For the further treatment of the hydrophobic materials the following quinones of the class of compounds (a) are suitable, for example: benzoquinone-(1,4), naphthoquinone-(1,4), 2,5-dichloro-benzoquinone-(1,4), 2,3,5,6-tetrachloro-benzoquinone-(1,4), 1,2-benzo- or naphthoquinone or their derivatives, 2,6-dichloro-benzoquinone, 2,3,6-trichloro-benzoquinone or the corresponding bromine derivatives, 2-phenyl-1,4-benzoquinone or its substitution products or any mixtures of these products.

As N-chloroquinone imines or N,N'-dichloro-quinone diimines (component b) to be used instead of the component (a) it is advantageous to use, besides the unsubstituted chloroimines, such mono- or dichloro-diimines which are further substituted in the quinoid nucleus, for example by halogen, such as chloro- or bromo-, lower alkyl or lower alkoxy groups. Components b which are particularly suitable are for example 2,6-dichloro-4-mono- or -1,4-dichlorimino-p-benzoquinone of the formula

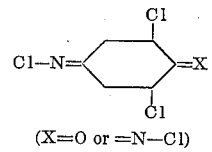

(X=O or =N—Cl)

furthermore 2,5-dichloro-N,N'-dichloro-p-benzoquinone diimine, 2-methyl-N,N'-dichloro-p-benzoquinone diimine or naphthoquinone-1,4-dichloro-diimine, 1,4-N,N'-di-chloro-imino - p - benzoquinone (1,4-dichloro-benzoquinone-diimine).

Mixtures of such N-halogeno-imines of the quinones or mixture of such compounds with optionally substituted benzo- or naphtho-quinones (component a) can also be used with satisfactory results.

Suitable compounds of the group (c) which can be used instead of compounds of the group (a) or (b) are, among others, cyclohexenone, cyclohexanedienone, heptachloro-cyclohexenone, pentachloro-tetralone, hexachloro-cyclohexadienone.

As compounds (d) can be used, inter alia: quinone-anil-N-chloro- or -bromimide or 2,5-dichloroquinone-anil-N-chlorimide.

In detail, the processes using the components (a), (b), (c) or (d) are carried out in such a way that the azomethines of the above mentioned composition and the compounds (a), (b), (c) or (d) are applied to the materials to be treated, for example fibres or fabrics, from neutral, acid or alkaline aqueous suspensions or solutions one after the other and in any order, preferably using dispersing agents or emulsifiers, from a dyeing bath or a padding liquor. According to the type of dyeing material the components are applied to the material at room temperature or at an elevated temperature, and the temperature is raised during the dyeing process, the optimum temperature being up to 140° C. At temperatures up to 100° C. it is sometimes advantageous to add customary carrier substances, such as trichlorobenzene, diphenyl, diphenyl ether or esters of aromatic carboxylic acids, to the dye bath. The procedure can, for example, be such that the dyeing material, for example fabrics or fibres of polyethylene terephthalate, is first introduced at room temperature into a dye bath or treated with a padding liquor containing, besides the azomethines of the specified type, emulsifiers or dispersing agents and, if desired, reducing agents; treatment is then continued at a slowly rising temperature, according to the type of the material to be treated, preferably at 70–140° C., until a sufficient quantity has been absorbed. It is advisable to interrupt the dyeing process at this stage, the treated material is rinsed, if desired dried intermediately, and subsequently introduced into a fresh bath containing the components (a), (b), (c) or (d) in the form of an aqueous solution or dispersion. Introduction into this second bath takes place at room temperature or a slightly elevated temperature and dyeing is continued until the optimum depth of color has been achieved, if desired with a rise of temperature to for example 140° C. The components can be applied with good results in the reversed order, by applying suitable components (a), (b), (c) or (d) or mixtures of such components from a dye bath or on a padding device to the material to be treated while raising the temperature, according to the type of material and the type of starting component employed, to up to 140° C., then subjecting the treated material, if desired, to intermediate drying at a higher temperature, and subsequently treating it in a new bath with the azomethine component, if desired together with reducing agents, preferably while raising the temperature to up to 140° C. The rubbing fastness of the dyeings thus obtainable can be improved by after-treatment with reducing agents such as sulfites or formaldehyde/sulfite addition products, frequently with the addition of an emulsifier.

A special modification of the above mentioned processes consists in that the material padded in the first phase with the azomethine component in the presence of hydrazine, is, in a continuous opertion, intermediately dried, then thermofixed for a short time at a higher temperature, preferably at 200–210° C. and then treated, if desired after subsequent soaping, in a dye bath or padding liquor with one of the components (a), (b), (c) or (d) or with mixtures of (a), (b) and/or (d).

The modified process in which, besides the azomethines of the above mentioned type compounds (e) which can be transformed into quinones are used together with oxidising agents (f) is carried out, in detail, in such a manner that the azomethine components and the compounds (e) as well as the oxidising agents (f) are applied similarly to the process described above to the materials to be treated, for example fibres or fabrics, from neutral, acid or alkaline aqueous suspensions or solutions, one after the other in any desired order, preferably using dispersing agents or emulsifiers, from a dye bath or a padding liquor. According to the type of dyeing material the components are applied to the material at room temperature or at an elevated temperature, and the temperature is then raised during the dyeing procedure, the optimum temperature being up to 140° C. At temperatures up to 100° C. it is sometimes advantageous to add to the dyeing bath customary carrier substances, such as trichlorobenzene, diphenyl, diphenyl ether or esters of aromatic carboxylic acids. The procedure is, for example, such that the material is first introduced at room temperature into a dye bath or treated with a padding liquor containing the azomethine or mixtures of such components, if desired in the presence of reducing agents; treatment is then continued at a slowly rising temperature, according to the material to be treated, preferably at 70–140° C., until the azomethine component has been absorbed in sufficient quantity. It is advisable to interrupt the dyeing process at this stage, the treated material is rinsed, if desired intermediately dried, and subsequently introduced into a fresh bath containing the compounds (e) and (f) in the form of an acid, neutral or alkaline aqueous solution or dispersion. Introduction into this second bath takes place at room temperature or at a slightly elevated temperature, and dyeing is continued until the optimum depth of shade is achieved, if desired while raising the temperature to, for example, 140° C.

The special modification of the process already mentioned above, according to which the material padded in the first phase with the azomethine component is, in a continuous operation, intermediately dried, then thermofixed for a short time at a raised temperature, preferably 200–210° C. can also be employed in this case, if the material is subsequently after-treated with the components (e) and (f) in a dye bath or a padding liquor.

For the further treatment with the components (e) are inter alia suitable hydroquinones; for example p-benzohydroquinone, substituted hydroquinones as those substituted with halogen, for example chlorine, or with lower alkyl or lower alkoxy groups. Further components which are transformed with oxidising agents into quinoid compounds and which can be used in the present process are p-aminophenols, p-aminonaphthols, p-arylene-diamines, such as p-phenylene-diamine, 1,4-naphthylene-diamine and 1,4-dihydroxy-naphthalene. These compounds, too, can be further substituted by preferably non-ionic radicals. Special reference may be made to: monochloro-hydroquinone, 2,5-dichloro-hydroquinone, 2,6-dichloro-hydroquinone, 2,5-dichloro-phenylene-diamine-(1,4) or 2,5-dichloroaminophenol-(1,4), monochloro-phenylene-diamine-(1,4), 3-chloro-4-aminophenol, 2-nitro-4-aminophenol, 4-aminophenol-sulfate, o-phenylene-diamine, o-aminophenol, pyrocatechol and 1-amino-2-hydroxy-3-chlorobenzene. Mixtures of such components of varying composition can also be used.

Suitable oxidising agents (f) are preferably those whose oxidation potential—according to the pH of the liquor—is either equal to or higher than the oxidation potential of component (e). In this sense the following can be used with particular advantage: organic peroxides such as benzoyl and acetyl peroxides, alkali metal bichromates, sodium chlorite, alkali metal permanganate, ceric sulphate and similar compounds, if desired in the presence of an alkali or acid.

As dispersing agents or emulsifiers which are added with advantage to the starting components or in the course of the dyeing processes described above the usual commercial products are suitable, such as waste liquor products of sulphite cellulose, condensation products of higher alcohols and ethylene oxide, soaps, polyglycol ethers of fatty acid amides, condensation products of aromatic sulphonic acids or mixtures of these compounds.

As reducing agents to be added, if desired, to the azomethine component the following are suitable, inter alia: sodium sulphide, sodium sulphite, sodium dithionite, sodium thiosulphate, hydroxylamine, hydrazine hydrate, sodium boranate, or mixtures of these compounds.

The dyeings obtained according to the new processes are distinguished by very good fastness properties such as fastness to wet processing, for example fastness to washing, rubbing, overdyeing and particularly also by excellent fastness to sublimation, ironing and very good fastness to light. Specially noteworthy are the fast black shades which are obtained on materials of aromatic polyesters, especially those made from fibres and fabrics of polyethylene terephthalates, which are inter alia used as textiles.

It is already known from German patent specification No. 1,079,587 that fast black dyeing on polyester materials can be obtained by applying aromatic mono- or polynuclear black bases which are suitable for oxidative dyeing to the materials and subsequently oxidising with chlorite in the presence of an acid or with hypohalogenous acids or certain hypohalogenous acid-yielding agents, for example with N-chloro- or N-bromo carbamic acid ethyl ester, N-halogen compounds, preferably of cyclic imides, such as N-bromo-succinimide, but especially N-halogen compounds of sulphonamides, preferably those of the aromatic series, such as benzene-sulphodichloramide, p-chlorobenzene-dichloramide and p-toluene-sulphochloramide sodium salt. These processes have the disadvantage that it is necessary to use chlorine-yielding agents, which, moreover, tend to hydrolyse already at room temperature by the action of moisture and thus render questionable a level appearance of the dyeings. Furthermore according to this method of procedure the amines are introduced in the form of aqueous dispersions which are known to be sensitive to oxidation and tend to form precipitations.

The new process obviates these disadvantages and frequently offers better possibilities of application because of an improved durability of the starting components and the water-solubility of the azomethine components. The quinones and the derivatives of the quinones and N,N'-dihalogeno-quinone-imines, which can be used in the present new processes are stable compounds, which can, for example, withstand boiling for a half hour in an aqueous medium—corresponding to customary dyeing conditions—without being changed.

The following examples are given for the purpose of illustrating the invention without, however, limiting it thereto.

*Example 1*

1.6 g. of the azomethine from 4-amino-diphenylamine and benzaldehyde-o,m- or p-sulphonic acid sodium salt are dissolved, while cold, in 30 ml. of water containing 2 g./litre of a weakly cation-active alkylphenyl ammonium sulphonate, and introduced into a dye bath of 200 ml. of water containing 1.5 g./litre of hydrazine hydrate and 5 g./litre of trichlorobenzene. After the addition of 10 g. of polyethyleneglycol terephthalates fibre in the form of skein or piece goods, the dyeing bath is brought to boiling temperature within about 15–20 minutes. After a dyeing time of one hour at this temperature the yellow dyed goods are rinsed well and after-treated in a fresh bath containing in 200 ml. water 1 g. of 2,5-dichloroquinone-1,4, 0.4 g. of a non-ionic alkylpolyglycol ether and 5 g./litre of trichlorobenzene, for 30 minutes at boiling temperature.

In order to improve the rubbing fastness, the material can be after-treated, after previous rinsing, in a slightly boiling bath with 4 ml./litre of sodium hydroxide solution (38° Bé.), 2 g./litre of sodium bisulphite and 1 g./litre of a polyglycol ether of a fatty acid amide for 10–30 minutes.

A black dyeing of very good fastness properties is obtained.

*Example 2*

0.5 g. of the azomethine from 2-amino-4'-methoxy-diphenylamine and benzaldehyde-o,m or p-sulphonic acid sodium salt are dissolved in 20 ml. of water and introduced into a dye bath of 200 ml. water containing 2 g./litre of sodium dithionite and 3 g./litre of cresotic acid methyl ester. 5 g. of polyethyleneglycol terephthalate fibre in the form of skein or piece goods are dyed at boiling temperature in this bath for 1–1½ hours. Subsequently the pre-dyed goods are rinsed and developed within about 30 minutes at boiling temperature in a bath containing 0.5 g. of trichlorobenzoquinone or any desired mixture of the products benzoquinone, mono-, di-, tri-, or tetrachlorobenzoquinone-1,4, 0.2 g. of a non-ionic alkylpolyglycol ether and 3 g./litre of any desired dyeing accelerator such as chlorobenzene. In order to improve rubbing fastness, the material can be after-treated as described in Example 1. A black dyeing with good fastness properties is obtained.

*Example 3*

5 g. of a fabric of polyethyleneglycol terephthalate fibres are pre-dyed with the aid of a laboratory high temperature dyeing apparatus in a bath of 200 ml. of water, containing besides 0.8 g. of the azomethine from 4-amino-2'-methoxy-diphenylamine and benzaldehyde-o-sulphonic acid sodium salt also 2 g./litre of sodium sulphide, for one hour at 120–125° C. At the end of this period the yellowwish dyed goods are rinsed and after-treated in a bath of 200 ml. of water containing 0.5 g. of 2,6-dichloroquinone-1,4 and 0.2 g. of a non-ionic alkyl polyglycol ether for about 30 minutes at 120–125° C. Subsequently the goods are rinsed and, if desired the goods are after-treated reductively as described in Example 1. A black dyeing with very good fastness properties is obtained.

*Example 4*

1 g. of the azomethine from 4-amino-4'-methoxy-diphenylamine and benzaldehyde-2,4-disulphonic acid sodium salt are dissolved in 30 ml. of water and introduced into a dyeing bath of 200 ml. of water containing 1 g./litre of sodium sulphide. In this dyeing liquor 10 g. of polyester fabric are treated for 1½ hours at 120° C. After intermediate cleansing the dyeing is developed in a dye bath of 200 ml. of water containing 0.4 g. of 2,5-dichloroquinone-1,4, 0.10 g. of potassium bichromate and 0.10 g. of sulphuric acid, within 30 minutes at 120° C. After reductive after-treatment a black dyeing with good fasteness properties is obtained.

If instead of the mixture of 2,5-dichloroquinone and potassium bichromate mixtures of 0.5 g. 2,5-dichlorohydroquinone and 0.5 g. of potassium bichromate or 0.5 g. of 2,6-dichlorohydroquinone and 1.5 g. of potassium permanganate are used, black dyeings with good fastness properties are also obtained.

*Example 5*

5 g. of polyethyleneglycol terephthalate fibre in the form of skein material are treated for 1½ hours in a boiling dye bath containing 0.5 g. of the azomethine from 4-aminodiphenylamine and benzaldehyde-m-sulphonic acid sodium salt, 6 g./litre of 25% hydrazine hydrate and 5 g./litre of trichlorobenzene. Subsequently the material is rinsed and developed for 30 minutes at boiling temperature in a fresh bath containing 0.2 g. of 3-chloro-4-aminophenol sulphate, 0.5 g. of potassium bichromate and 0.5 g. of sulphuric acid. A black-grey dyeing of good fastness properties is obtained.

*Example 6*

10 g. of a fabric of polyethyleneglycol terephthalate fibres are padded with a liquor containing 80 g./litre of the azomethine from 4-aminodiphenylamine and benzaldehyde-p-sulphonic acid sodium salt, 10 g./litre of a neutral or weakly cation-active emulsifier, for example, an alkylphenyl ammonium sulphonate, and 10 g./litre of 25% hydrazine hydrate, the liquor absorption being 100%. The padded fabric is heated, after intermediate drying, for 90 seconds to 180° C. After short intermediate rinsing, the dyeing is completed in a bath which contains in 400 ml. of water 0.8 g. of 2,5-dichloroquinone-1,4, as obtained in technical production, and about 0.5 g. of a commercial dyeing accelerator within ½ hour at boiling temperature. After a reductive after-treatment as described in Example 1, a black dyeing with excellent fastness properties is obtained.

Example 7

50 g. of the azomethine from 4-amino-4′-methoxy-diphenylamine and benzaldehyde-o-sulphonic acid sodium salt are dissolved in 500 ml. of water together with 10 g. of technical sodium sulphide introduced into a dye bath containing in 12 litres of water 500 g. of polyester fibres in the form of combed material. Dyeing is carried out at 120° C. within one hour. Subsequently the material is rinsed and the dyeing is completed in a fresh bath of 12 litres of water which contains 30 g. of 2,5-dichloroquinone-1,4 and 30 g. of a naphthalene sulphonic acid-formaldehyde condensation product within 30 minutes at 120° C. After the after-treatment described in Example 1 a black dyeing with excellent fastness properties is obtained.

Example 8

1.5 g. of the bis-azomethine from N,N′-di(p-aminophenyl)-4,4′-diamino-diphenylamine and benzaldehyde-o,m- or p-sulphonic acid sodium salt are dissolved in 50 ml. of water together with 0.4 g. of sodium sulphide, and introduced into a dye bath of 200 ml. of water which also contains 5 g./litre of trichlorobenzene. In this dye bath 10 g. of a fabric of polyethylene glycol terephthalate fibres are treated at boiling temperature for one hour. The material is subsequently rinsed and after-treated in a fresh bath containing in 200 ml. of water 0.8 g. of tetrachloroquinone-1,4 or the same quantity of 2,3-dichloronaphthoquinone-1,4 and 0.4 g. of a non-ionic alkylpolyglycol ether for 30 minutes at boiling temperature. A black dyeing of good fastness properties is obtained.

If instead of the above mentioned azomethine there are used bis-azomethines from N,N′-bis-[4-aminophenyl]-4,4′-diaminodiphenyl ether, N,N′-bis-[4-aminophenyl]-4,4′-diaminostilbene or N,N′-bis-[4-aminophenyl]-4,4′-diamino-3,3′-dimethoxy-diphenyl, grey to black dyeings of good fastness properties are likewise obtained.

Example 9

10 g. of a fibre fabric of polyethyleneglycol terephthalate are treated in a bath of 300 ml. of water containing 1.2 g. of dissolved azomethine from 4-amino-2′-methoxydiphenylamine and benzaldehyde-o,m- or p-sulphonic acid sodium salt, 0.3 g. of sodium sulphide and 2 g. of trichlorobenzene for 1–1½ hours at boiling temperature. After an intermediate cleansing the dyeing is developed in a bath of 300 ml. of water containing 0.6 g. of 2-phenylbenzoquinone-1,4 and 2 g. of trichlorobenzene within a half hour at boiling temperature. A black-grey dyeing of good fastness properties is obtained.

If instead of 2-phenyl-benzoquinone-1,4 1 g. of heptachloro-cyclohexenone or 1 g. of pentachloro-α-tetralone are used black dyeings with good fastness properties are likewise obtained.

Example 10

500 g. of a polyethyleneglycol terephthalate fibre combing are treated in a bath of 12 litres of water containing 50 g. of the azomethine from 4-amino-diphenylamine and benzaldehyde-o-sulphonic acid sodium salt and 6 g. of sodium sulphide for one hour at 120° C. After subsequent rinsing, the dyeing is completed in e bath containing in 12 litres of water 25 g. of N,N′-dichloroquinone-diimine

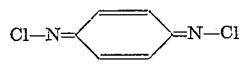

and 25 g. of a naphthalene-sulphonic acid-formaldehyde condensation product within 30 minutes at 120° C. After a final reductive after-treatment as described in Example 1, a black dyeing with excellent fastness properties is obtained.

If instead of N,N′-dichloroquinone-diimine the same quantity of N,N′-dichloro-naphthoquinone-diimine-1,4 or N-chloro-2,6-dichloroquinonimine is used, black dyeings with very good fastness properties are likewise obtained.

Example 11

50 g. of polyethylene glycol terephthalate fibre in the form of skein material on a cross wound bobbin are treated in a bath which contains in 500 ml. of water 1 g. of sodium sulphide or the same quantity of sodium hydrogensulphite or of potassium boranate and 5 g. of the azomethine from 4-amino-4′-methoxy-diphenylamine and benzaldehyde-4-sulphonic acid sodium salt for one hour at 110° C. At the end of this period the yellow dyed material is rinsed and treated for 15 minutes at boiling temperature in a bath containing in 500 ml. of water 3 g. of quinone-anil-N-chlorimide

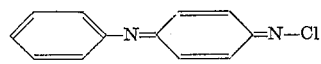

4 g. of a customary dispersing agent (for example a naphthalene sulphonic acid-formaldehyde condensation product), and 2 g. of trichlorobenzene. After a reduction after-treatment as described in Example 1, a black dyeing with good fastness properties is obtained.

Example 12

10 g. of triacetate fibre in the form of skein material are treated in a bath of 400 ml. of water containing 1.0 g. of the azomethine from 4-amino-4′-methoxy-diphenylamine and o-, m- or p-benzaldehyde-sulphonic acid sodium salt and 2 g. of trichlorobenzene for one hour at boiling temperature. After intermediate rinsing of the material, the dyestuff is developed in a bath cf 400 ml. of water containing 0.5 g. of 2,5-dichloro-quinone-1,4 and 0.5 g. of a naphthalene sulphonic acid-formaldehyde condensation product by treating at boiling temperature for ½ hour. A black dyeing with very good fastness properties is obtained.

Example 13

25 g. of polyacrylonitrile fibres are dyed for one hour while boiling in a bath of 1000 ml. of water with 2 g. of the azomethine from 4-amino-diphenylamine and benzaldehyde-p-sulphonic acid sodium salt and, after intermediate rinsing, developed within 30 minutes at boiling temperature with 1.2 g. of N,N′-dichloroquinone-diimine. A black dyeing with very good fastness properties is obtained. A black dyeing is also obtained if, instead of the polyacrylonitrile fibre a polyvinyl chloride fibre is dyed according to this method.

Example 14

5 g. of acetate fibre are dyed for one hour at 85° C. in a bath of 200 ml. of water with 0.5 g. of the azomethine from 4-amino-4′-cyclohexyl-diphenylamine and benzaldehyde-o-sulphonic acid sodium salt. At the end of this period the material is rinsed and, for the development of the dyestuff, developed with 0.3 g. of trichloroquinone with the addition of 0.3 g. of a non-ionic alkylpolyglycol ether for 30 minutes at 85° C. A black dyeing with good fastness properties is obtained.

Example 15

0.5 g. of the azomethine from 7-amino-2-naphthol and benzaldehyde-o,m- or p-sulphonic acid sodium salt are dissolved in 20 ml. of water and introduced into a dye bath of 200 ml. of water containing 2 g./litre sodium sulphite and 3 g./litre cresotic acid methyl ester. 5 g. of polyethylenglycol terephthalate fibre in the form of skein or piece material are dyed in this bath for 1–1½ hours at boiling temperature. The pre-dyed material is subsequently rinsed and developed in a bath containing 0.5 g. of N,N′-dichloro-2,5-dichloroquinone-diimine-1,4, 0.2 g. of a non-ionic alkylpolyglycol ether and 3 g./litre of any desired dyeing accelerator, such as chlorobenzene, within about 30 minutes at boiling temperature. In order to improve rubbing fastness, the material can be after-treated as described in Example 1. A brown dyeing is obtained. Instead of the azomethine used here, the bis-azomethine from 1,5-diamino-naphthalene and benzaldehyde-o,m or p-sulphonic acid sodium salt can also be used.

Example 16

1 g. of the azomethine from 2,4-dinitro-4'-amino-diphenylamine and benzaldehyde-2,4-disulphonic acid sodium salt are dissolved in 30 ml. of water and introduced into a dye bath of 200 ml. of water containing 1 g./litre of sodium sulphide. 10 g. of polyester fabric are treated in this dye bath for 1½ hours at 120° C. After intermediate cleansing the dyeing is developed in a dye bath of 200 ml. of water containing 0.4 g. of 2,5-dichloroquinone-1,4, 0.10 g. of potassium bichromate and 0.10 g. of sulphuric acid within 30 minutes at 120° C. After a reductive after-treatment, a brown dyeing is obtained.

Example 17

1.6 g. of the azomethine from 4-amino-diphenylamine and benzaldehyde are dispersed cold in 30 ml. of water containing 2 g./litre of a weakly cation-active alkylenephenyl ammonium sulphonate and introduced into a dye bath of 200 ml. of water containing 1.5 g./litre of hydrazine hydrate and 5 g./litre of trichlorobenzene. After the addition of 10 g. of polyethyleneglycol terephthalate fibre in the form of skein or piece material, the dye bath is heated in the course of about 15–20 minutes to boiling temperature. After a dyeing period of one hour at this temperature the pre-dyed material is well rinsed and after-treated in a fresh bath containing in 200 ml. of water 1 g. of 2,5-dichloroquinone-1,4, 2 g. of salicylic acid, 0.4 g. of a non-ionic alkylpolyglycol ether and 5 g./litre of trichlorobenzene, for 30 minutes at boiling temperature.

In order to improve rubbing fastness, the material can be after-treated, after previous rinsing, in a slowly boiling bath with 4 ml./litre of sodium hydroxide solution (38° Bé.) 2 g./litre of sodium bisulphite and 1 g./litre of polyglycol ether of a fatty acid amide for 10–30 minutes.

A black dyeing with very good fastness properties is obtained.

Example 18

0.5 g. of the azomethine from 4-amino-4'methoxydiphenylamine and 4-nitro-benzaldehyde are introduced in a finely divided form into a dye bath of 200 ml. water together with 0.5 g. of a suitable dispersing agent, 0.2 g. of sodium sulphite and 1 g. of dichlorobenzene. 5 g. of polyethyleneglycol therephthalate fibre in the from of skein or piece material are dyed in this bath for 1–1½ hours at boiling temperature. Subsequently the pre-dyed material is rinsed and developed within about 30 minutes at boiling temperature in a bath containing 0.5 g. of trichlorobenzoquinone (or any desired mixture of the products benzoquinone, mono-, di-, tri- or tetrachlorobenzoquinone-1,4) 0.2 g. of a non-ionic alkylpolyglycol ether, 10 g./litre of benzoic acid and 3 g./litre of any desired dyeing accelerator such as chlorobenzene. In order to improve rubbing fastness, the material can be after-treated as described in Example 17. A black dyeing with good fastness properties is obtained.

Example 19

5 g. of a fabric of polyethyleneglycol terepthalate fibre are pre-dyed with the aid of a laboratory high temperature dyeing apparatus within 1 hour at 120–125° C. in a bath of 200 ml. of water which contains, besides 0.8 g. of finely divided azomethine from 4-amino-2'-methoxy-diphenylamine and 4-methoxy-benzaldehyde and 5 g. of a weakly anion-active alkylphenylpolyglycol ether sulphate, also 2 g./liter of sodium sulphide. At the end of this period the pre-dyed material is rinsed and after-treated within about 30 minutes at 120–125° C. in a bath of 200 ml. of water containing 0.5 g. of 2,6-dichloroquinone-1,4, 10 g./litre of salicylic acid and 0.2 g. of a non-ionic alkylpolyglycol ether. Subsequently the material is rinsed, and if the rubbing fastness is insufficient, after-treated reductively as described in Example 17. A black dyeing with very good fastness properties is obtained.

Example 20

0.7 g. of the azomethine from 4-amino-4'-methoxy-diphenylamine and benzaldehyde are finely dispersed together with 1 g. of an anion-active alkylphenyl-polyglycol ether sulphate and introduced into a dye bath of 200 ml. of water containing 1 g./litre of sodium sulphide. 10 g. of polyester fabric are treated in this dyeing liquor for 1½ hours at 120° C. After intermediate cleansing the dyeing is developed within 30 minutes at 120° C. in a dye bath of 200 ml. of water containing 0.4 g. of 2,5-dichloroquinone-1,4, 1 g. of phenyldisulphimide, 0.10 g. of potassium bichromate and 0.10 g. of sulphuric acid. A black dyeing with good fastness properties is obtained.

If instead of the mixture 2,5-dichloroquinone and potassium bichromate mixtures of 0.5 g. of 2,5-dichlorohydroquinone and 0.5 g. of potassium bichromate or
0.5 g. of 2,6-dichlorohydroquinone and 1.5 g. of potassium permanganate are used black dyeings with good fastness properties are likewise obtained.

Example 21

5 g. of polyethyleneglycol terephthalate fibre in the form of skein material are treated for 1½ hours while boiling in a dyeing liquor, containing, besides 0.5 g. of a customary dispersing agent, 0.5 g. of the azomethine from 4-aminodiphenylamine and 4 - dimethylamino-benzaldehyde in a finely dispersed form, 6 g./litre of 25% hydrazine hydrate and 5 g./litre of trichlorobenzene. Subsequently the material is rinsed and developed for 30 minutes at boiling temperature in a fresh bath containing 0.2 g. of 3-chloro-4-aminophenol sulphate, 2 g. of salicylic acid, 0.5 g. of potassium bichromate and 0.5 g. of sulphuric acid. A black-grey dyeing of good fastness properties is obtained.

Example 22

10 g. of a fabric of polyethyleneglycol terephthalate fibre are padded with a liquor containing 80 g./litre of finely dispersed azomethine from 4-aminodiphenylamine and 4-nitro-benzaldehyde, 10 g./litre of a neutral or weakly cation-active emulsifier, for example an alkylphenyl ammonium sulphonate, and 10 g./litre of 25% hydrazine hydrate, the absorption of liquor being 100%. The padded fabric is heated, after intermediate drying, for 90 seconds to 180° C. After short intermediate rinsing, the dyeing is completed within a half hour at boiling temperature in a bath containing in 400 ml. of water 0.8 g. of 2,5-dichloroquinone-1,4 as obtained in the technical production, 3 g. of salicylic acid and about 0.5 g. of a commercial dyeing accelerator. After a reductive after-treatment as described in Example 17, a black dyeing with outstanding fastness properties is obtained.

Example 23

30 g. of azomethine from 4-amino - 4'-methoxy-diphenylamine and benzaldehyde are dispersed together with 30 g. of an anion-active alkylphenyl polyglycol ether sulphate in the presence of 10 g. of technical sodium sulphide in 500 ml. of water and introduced into a dye bath containing in 12 litres of water 500 g. of polyester fibres in the form of a combing. Dyeing is carried out for one hour at 110° C. Subsequently the material is rinsed and the dyeing is completed within 30 minutes at a temperature of 110° C. in a fresh bath of 12 litres of water containing 30 g. of 2,5-dichloroquinone-1,4, 50 g. of phenyldisulphimide and 30 g. of a naphthalene sulphonic acid-formaldehyde condensation product. After the after-treatment described in Example 17, a black dyeing with outstanding fastness properties is obtained.

Example 24

1.5 g. of the bis-azomethine from N,N' - (p-amino-phenyl) - 4,4' - diamino-diphenylamine and 4 - dimethyl-amino-benzaldehyde are dispersed in 50 ml. of water together with 2 g. of a customary dispersing agent in the presence of 0.4 g. of sodium sulphide and introduced into a dye bath of 200 ml. of water which also contains 5 g./litre of trichlorobenzene. 10 g. of a fabric of polyethyleneglycol terephthalate fibre are treated in this dye bath for one hour at boiling temperature. Subsequently the material is rinsed and after-treated for 30 minutes at boiling temperature in a fresh bath containing in 200 ml. of water 0.8 g. of tetrachloroquinone-1,4 (or the same quantity of 2,3-dichloronaphthoquinone-1,4), 5 g. of benzoic acid and 0.4 g. of a non-ionic alkylglycol ether. After a final reductive after-treatment as described in Example 17, a black dyeing of good fastness properties is obtained.

If instead of the above mentioned azomethine there are used bis-azomethines from N,N'-bis-4-aminophenyl-4,4'-diamino-diphenyl ether, N,N'-bis-4-aminophenyl-4,4'-diamino-stilbene or N,N'-bis-4-aminophenyl - 4,4'-diamino-3,3'-dimethoxy diphenyl, grey to black dyeings with good fastness properties are also obtained.

Example 25

10 g. of a fibre fabric of polyethyleneglycol terephthalate are treated for 1–1½ hours at boiling temperature in a bath of 300 ml. of water containing 1.2 g. of finely dispersed azomethine from 4-amino-2'-methoxy-diphenylamine and benzaldehyde, 0.3 g. of sodium sulphide and 2 g. of trichlorobenzene. After intermediate cleansing, the dyeing is developed within a half hour at boiling temperature in a bath of 300 ml. of water containing 0.6 g. of 2-phenylbenzoquinone-1,4 2 g. of salicylic acid and 2 g. of trichlorobenzene. A black-grey dyeing with good fastness properties is obtained.

If instead of 2-phenylbenzoquinone-1,4 1 g. of heptachloro-cyclohexenone or 1 g. of pentachloro-α-tetralone are used, black dyeings with good fastness properties are likewise obtained.

Example 26

500 g. of a combining of polyethyleneglycol terephthalate fibre are treated for one hour at 120° C. in a bath of 12 litres of water containing 30 g. of finely dispersed azomethine from 4-amino-diphenylamine and 4-nitrobenzaldehyde, 30 g. of a customary dispersing agent and 6 g. of sodium sulphide. After subsequent rinsing the dyeing is completed within 30 minutes at 120° C. in a bath containing in 12 litres of water 25 g. of N,N'-dichloroquinone-diimine

and 25 g. of a naphthalene-sulphonic acid-formaldehyde condensation product. After a final reductive after-treatment as described in Example 17, a black dyeing with excellent fastness properties is obtained.

If instead of the N,N'-dichloroquinone-diimine, the same quantity of N,N'-dichloronaphthoquinone-diimine-1,4 or of N-chloro-2,6-dichloroquinonimine is used, black dyeings with very good fastness properties are likewise obtained.

Example 27

10 g. of triacetate fibre in the form of skein material are treated for one hour at boiling temperature in a bath of 400 ml. of water containing 0.7 g. of the azomethine from 4-amino-4'-methoxy-diphenylamine and 4-methoxy-benzaldehyde, 1 g. of a customary dispersing agent and 2 g. of trichlorobenzene. After intermediate rinsing of the material, the dyestuff is developed by treating for ½ hour at boiling temperature in a bath of 400 ml. of water containing 0.5 g. of 2,5-dichloroquinone-1,4, 5 g. of benzoic acid and 0.5 g. of a naphthalene-sulphonic acid-formaldehyde condensation product. After a reductive after-treatment, a black dyeing with very good fastness properties is obtained.

Example 28

25 g. of polyacrylonitrile fibre are dyed while boiling for one hour in a bath of 1000 ml. of water with 2 g. of the azomethine from 4-amino-diphenylamine and 4-nitro-benzaldehyde and, after intermediate rinsing, developed within 30 minutes at boiling temperature with 1.2 g. of N,N'-dichloroquinone-diimine. A black dyeing with very good fastness properties is obtained. If instead of the polyacrylonitrile fibre, a polyvinyl chloride fibre is dyed according to this method, a black dyeing is also obtained.

Example 29

5 g. of acetate fibre are dyed within one hour at 85° C. in a bath of 200 ml. of water with 0.5 g. of the azomethine from 4-amino-4'-cyclohexyl-diphenylamine and 4-nitro-benzaldehyde. At the end of this period the material is rinsed and developed, in order to develop the dyestuff, for 30 minutes at 85° C. in a bath of 200 ml. with 0.3 g. of trichloroquinone-1,4 with the addition of 2 g. of salicylic acid, 0.3 g. of a non-ionic alkylpolyglycol ether. A black dyeing of good fastness properties is obtained.

Example 30

0.3 of the azomethine from 7-amino-2-naphthol and benzaldehyde are finely dispersed in 20 ml. of water in the presence of 0.5 g. of a customary dispersing agent and introduced into a dye bath of 200 ml. of water containing 2 g./litre of sodium sulphide and 3 g./litre of trichlorobenzene. 5 g. of polyethyleneglycol terephthalate fibre in the form of skein or piece material are dyed in this bath for 1-1½ hours at boiling temperature. Subsequently the pre-dyed material is rinsed and developed within about 30 minutes at boiling temperature in a bath containing 0.5 g. of N,N'-dichloro-2,5-dichloroquinone-diimine-1,4, 0.2 g. of a non-ionic alkylpolyglycol ether and 3 g./litre of any desired dyeing accelerator, such as chlorobenzene. In order to improve rubbing fastness the material can be after-treated as described in Example 17. A brown dyeing is obtained. Instead of the azomethine used above the bis-azomethine from 1,5-diamino naphthalene and benzaldehyde can also be used.

Example 31

1 g. of the azomethine from 2,4-dinitro-4'-aminodiphenylamine and 4-nitro-benzaldehyde are well dispersed in 30 ml. water in the presence of 1 g. of a customary dispersing agent and introduced into a dye bath of 200 ml. of water containing 1 g./litre of sodium sulphide. 10 g. of polyester fabric are treated in this dye bath for 1½ hours at 120° C. After intermediate cleansing the dyeing is developed within 30 minutes at 120° C. in a dye bath of 200 ml. of water containing 0.4 g. of 2,5-dichloroquinone-1,4 2 g. of salicylic acid, 0.10 g. of potassium bichromate and 0.10 g. of sulphuric acid. After reductive after-treatment a brown dyeing is obtained.

Example 32

50 g. of polyethyleneglycol terephthalate fibre in the form of skein material on a cross wound bobbing are treated for one hour at 110° C. in a bath containing in 500 ml. of water 1 g. of sodium sulphide or the same quantity of sodium hydrogen-sulphite or potassium boranate, 3 g. of the azomethine from 4-amino-4'-methoxy-diphenylamine and 4-nitro-benzaldehyde and 3 g. of an anion-active alkylphenyl-polyglycol ether sulphate. At the end of this period the pre-dyed material is rinsed and treated for 15 minutes at boiling temperature in a bath containing in 500 ml. of water 3 g. of quinone-anil-N-chlorimide

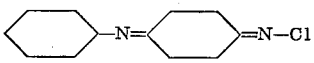

4 g. of a customary dispersing agent (for example a naphthalene sulphonic acid-formaldehyde condensation product) and 2 g. of trichlorobenzene. After reductive after-treatment as described in Example 17, a black dyeing of good fastness properties is obtained.

*Example 33*

5 g. of a fabric of polyethyleneglycol terephthalate fibre are pre-dyed within one hour at 120–125° C. with the aid of a laboratory high temperature dyeing apparatus in a bath of 200 ml. of water containing, besides 0.8 g. of the azomethine from 4-amino-2'-methoxy-diphenylamine and benzaldehyde-o-sulphonic acid sodium salt, also 2 g./litre of sodium sulphide. At the end of this period the yellowish dyed material is rinsed. The development of the dyestuff is carried out on the fibre in such a way that 4 g. of a customary dispersing agent, 2.5 ml. of 25% sodium hypochlorite and then 0.25 g. of p-phenylene-diamino-dichlorohydrate are introduced into the cold bath of 20 ml. of water, which is then slowly heated to boiling temperature, maintained at this temperature for 30 minutes and the material is then rinsed. A deep black dyeing of good fastness properties is obtained.

We claim:
1. A process for coloring a hydrophobic textile selected from the group consisting of linear aromatic polyesters, synthetic linear polyamides, polyurethanes, polyvinyl chlorides, polyacrylonitrile, cellulose esters and polyolefins which comprises contacting the hydrophobic textile in separate steps with (1) an azomethine of an aromatic amine and (2) with a quinone.

2. The process of claim 1 wherein the hydrophobic textile is a linear aromatic polyester and the quinone is a member selected from the group consisting of 2,3,5,6-tetrachloroquinone-(1,4); 2,5 - dichloro-benzoquinone-(1,4); and naphthoquinone-(1,4).

3. The process of claim 1 wherein the quinone is formed in a contacting bath by the action of an oxidizing agent on a compound selected from the group consisting of 1-amino-4-hydroxy-3-chlorobenzene, 1,4-diamino - 2,5 - dichlorobenzene; 1,4 - diamino - 2 - chlorobenzene; and 1,5-dihydroxy-2,5-dichlorobenzene.

4. A process for coloring a hydrophobic textile selected from the group consisting of linear aromatic polyesters, synthetic linear polyamides, polyurethanes, polyvinyl chlorides, polyacrylonitrile, cellulose esters, and polyolefins which comprises contacting the hydrophobic textile in separate steps with (1) an azomethine of an aromatic amine and (2) with a mononuclear N-halogeno-quinonimine.

5. The process of claim 4 wherein the hydrophobic textile is first contacted with the azomethine component.

6. The process of claim 4 wherein the hydrophobic textile is dried between the first and second contacting step.

7. The process of claim 4 wherein the hydrophobic textile is first contacted with the azomethine then thermo-fixed at an elevated temperature up to about 210° C. and subsequently subjected to the second contacting step.

8. The process of claim 4 wherein a mixture of azomethines is employed.

9. The process of claim 4 wherein the azomethine is employed in conjunction with a reducing agent which prevents oxidation of the azomethine.

10. The process of claim 4 wherein the hydrophobic textile is first contacted with the azomethine obtained from 4-amino-diphenylamine and benzaldehyde-o-sulfonic acid and then contacted with N,N'-dichloroquinone-imine-1,4.

11. The process of claim 4 wherein the azomethine is prepared from (a) an amine selected from the group consisting of 4 - amino - 4' - methoxy - and - 2'-methoxydiphenylamine, 1 - amino - 4 - phenylamino - naphthalene, 4,4' - diamino azobenzene, p - aminophenylamine - diphenyl, p - aminophenylamine - diphenyloxide, 4 - aminodiphenylamine, 4 - amino - 4' - cyclohexyldiphenylamine and (b) an aldehyde selected from the group consisting of benzaldehyde, benzaldehyde-o-, -m- and -p-monosulfonic acid and -2,4-disulfonic acid, benzaldehyde-2,5-disulfonic acid, 4 - dimethylamino-benzaldehyde, o-nitro-benzaldehyde, p-nitro-benzaldehyde, o-methoxybenzaldehyde and p-methoxybenzaldehyde.

12. The process of claim 4 wherein the hydrophobic textile is first contacted with the azomethine obtained from 4-aminodiphenylamine and benzaldehyde-p-sulfonic acid and then contacted with N,N'-dichloroquinone-imine-1,4.

13. The process of claim 4 wherein the hydrophobic textile is first contacted with the azomethine obtained from 4-aminodiphenylamine and benzaldehyde-m-sulfonic acid and then contacted with N,N'-dichloroquinone-imine-1,4.

14. The process of claim 4 wherein the hydrophobic textile is first contacted with the azomethine obtained from 4-amino-4'-methoxy-diphenylamine and benzaldehyde-o-sulfonic acid and then contacted with N,N'-dichloroquinone-imine-1,4.

15. The process of claim 4 wherein the hydrophobic textile is first contacted with the azomethine obtained from 4-amino-4'-methoxy-diphenylamine and benzaldehyde-p-sulfonic acid and then contacted with N,N'-dichloroquinone-imine-1,4.

16. The process of claim 4 wherein the hydrophobic textile is first contacted with the azomethine obtained from 4-amino-4'-methoxy-diphenylamine and benzaldehyde-m-sulfonic acid and then contacted with N,N'-dichloroquinone-imine-1,4.

17. The process of claim 11 wherein the hydrophobic textile is a linear aromatic polyester and the mononuclear N-halogeno-quinoimine is selected from the group consisting of 2,6-dichloro-4-N-chlorobenzoquinone - 1-imine - 4; N,N' - dichlorobenzoquinone - imine - 1,4 and 2,6-dichloro-N,N'-dichloro-benzoquinone-imine-1,4.

18. The process of claim 17 wherein the polymeric textile is polyethylene terephthalate.

19. The process of claim 17 wherein the polymeric textile is the aromatic polyester from terephthalic acid and 1,4-bis-hydroxymethyl-cyclohexane.

20. A process for coloring a hydrophobic textile selected from the group consisting of linear aromatic polyesters, synthetic linear polyamides, polyurethanes, polyvinyl chlorides, polyacrylonitrile, cellulose esters and polyolefins which comprises contacting the hydrophobic textile in separate steps with (1) an azomethine of an aromatic amine and (2) with a compound selected from the group consisting of cyclohexenone, cyclohexanedinone, heptachloro-cyclohexenone, pentachloro-tetralone, and hexachloro-cyclohexadienone.

21. The process of claim 17 wherein the hydrophobic textile is a linear aromatic polyester and the compound is selected from the group consisting of hexachloro-cyclohexadienone and heptachloro-cyclohexenone.

22. A process for coloring a hydrophobic textile selected from the group consisting of linear aromatic polyesters, synthetic linear polyamides, polyurethanes, polyvinyl chlorides, polyacrylonitrile, cellulose esters and polyolefins which comprises contacting the hydrophobic textile in separate steps with (1) an azomethine of an aromatic amine and (2) with a quinone-anil-N-halogenimide.

23. The process of claim 19 wherein the quinone-anil-N-halogenimide is quinone-anil-N-chlorimide.

24. A product of claim 1.

25. A product of claim 4.
26. A product of claim 20.
27. A product of claim 22.

References Cited by the Examiner

UNITED STATES PATENTS

| | | | |
|---|---|---|---|
| 2,086,337 | 7/1937 | Schirm | 8—39 |
| 2,926,060 | 2/1960 | Lehman | 8—32 X |
| 3,005,677 | 10/1961 | Weis | 8—32 |
| 3,036,875 | 5/1962 | Schlack. | |
| 3,058,797 | 10/1962 | Gies. | |

FOREIGN PATENTS

| | | |
|---|---|---|
| 23,193 | 1904 | Great Britain. |
| 16,189 | 1907 | Great Britain. |
| 307,391 | 10/1955 | Japan. |

OTHER REFERENCES

Shinomiya et al., Chem. Abstr., 1958, vol. 52, column 737(d)

NORMAN G. TORCHIN, *Primary Examiner.*

ABRAHAM H. WINKELSTEIN, *Examiner.*

D. LEVY, *Assistant Examiner.*